United States Patent [19]

Kammerl et al.

[11] 3,787,635

[45] Jan. 22, 1974

[54] METHOD AND APPARATUS FOR MONITORING CONNECTIONS IN A PROGRAM CONTROLLED PROCESSING SYSTEM

[75] Inventors: Anton Kammerl, Grobenzell; Hasso Steigenberger, Unterhaching, both of Germany

[73] Assignee: Siemens Aktiengesellschaft, Berlin and Munich, Germany

[22] Filed: Apr. 19, 1972

[21] Appl. No.: 245,551

[30] Foreign Application Priority Data

Apr. 19, 1971 Germany .................. P 21 18 930.0

[52] U.S. Cl. ........ 179/18 ES, 179/15 BF, 179/18 FF

[51] Int. Cl. .............................................. H04m 3/12

[58] Field of Search 179/18 ES, 18 FF, 15 BF, 18 F, 179/18 FA; 178/3

[56] References Cited

UNITED STATES PATENTS

| | | | |
|---|---|---|---|
| 3,576,398 | 4/1971 | Dejean | 179/18 ES |
| 3,647,979 | 3/1972 | Rubin | 179/18 ES |
| 3,336,442 | 8/1967 | Casterline | 179/18 ES |

*Primary Examiner*—William C. Cooper
*Assistant Examiner*—David L. Stewart
*Attorney, Agent, or Firm*—Harold J. Birch et al.

[57] ABSTRACT

A method and apparatus for monitoring system connection units in program controlled telecommunications exchange systems to determine which units are producing connection requirements is described. Incoming and outgoing connections are identified over input and output code transducers. A storage cell in the central memory is permanently assigned to each incoming connection, and this storage cell can be accessed on the basis of the identification process carried on in the input code transducer. An operating cycle is simultaneously requested, and the system connecting unit generating a requirement is interrogated. The address of the system connection unit producing a request is identified and placed in a first address store. The address of an immediately preceding request is placed in a second address store. The contents of the two stores are compared, and in case of lack of identity the address in the first store is transferred to the second store. If identity is determined, an indication thereof is forwarded to a store for continuous requirements, and this causes the production of a signal for blocking the inputs to the second address store. A second comparison process then takes place between the address in the second address store and the addresses which are assigned to the succeeding connection requests. In case of a determination of identity in this second comparison process the connection requirement is blocked from being forwarded to the transmission sequence control and an advancing signal arrives at the input code converter.

4 Claims, 2 Drawing Figures

METHOD AND APPARATUS FOR MONITORING CONNECTIONS IN A PROGRAM CONTROLLED PROCESSING SYSTEM

BACKGROUND OF THE INVENTION

The invention concerns a method and apparatus for monitoring operations in a program controlled processing system which operations generate further operating requirements. The invention is particularly useful in connection with program controlled telecommunication exchange systems, in which the identification of incoming and outgoing connections takes place over input and output code transducers, respectively. In such systems a storage cell within a central store is permanently associated with the incoming connection, and this storage cell can be reached on the basis of the address of the incoming connection determined through identification by the input code transducer. Simultaneous therewith an operating cycle is requested by sending a request signal to the central store for the purpose of querying an incoming connection which offers a switching requirement.

In such a processing system, as is known, the transmission of data between incoming and outgoing connection lines always occurs over a central store or memory, with which the processing units of the system, including also those to which the incoming and outgoing connection lines are connected, have traffic cyclically. An example of such a processing unit is the conventional line connection unit. A request for a storage cycle by a line connection unit, initiated, for example, or a polarity change on the incoming line, occurs in a manner such that with the arrival of a datum on an incoming connection line the identification of the connection offering the requirement is initiated, by the input code transducer, and a cycle requirement is effected by sending the request signal to the cental store. Thereby, in the central store the storage cell assigned to this connection can be reached; this storage cell contains a datum about the desired outgoing connection. This datum is available to the line connection unit for selection of the desired outgoing connection, by the output code transducer. The polarity change, i.e., the information to be transmitted, is then transferred to it.

The principle of such a processing system is shown in the example of a processing system in FIG. 1. This system is a part of the prior art and is more fully described in U.S. Pat. No. 3,717,723. In particular, in a system of this type incoming connections on incoming lines and outgoing connections on outgoing lines are connected to a line connection unit LE, as shon in FIG. 1 herein. The latter contains a system connection unit SAE, an input code converter ECW and an output code converter ACW, as well as a transmission lprogram control UEAS. By means of a channel for the transmission of control and data signals the line connection unit LE has access to a central store KS which in turn contains a core store. The system connection unit SAE within the line connection unit LE contains the individual system connection circuits SA, each of which is assigned to a connection, i.e., each of which is assigned to an incoming and an outgoing line.

As discussed in the above referenced U.S. Pat. No. 3,717,723, each change in a binary level is detected by the system connection circuit and is conveyed to the central store KS and is there recorded in a storage cell assigned to the particular transmitter. However, is is also available in the transmission program control UEAS and can be transmitted from there with the aid of the receiver address supplied by the central store to the desired receiver, i.e., to the system connection circuit assigned to it. This traffic of the line connection unit LE with the central store KS takes place according to the principle of requests and proceed to send. The identification of the requesting transmitters, i.e., of transmitters emitting a polarity change, takes place in input code transducer ECW which seeks the transmitter in question and transmits the address thereof in binary code to transmission program control UEAS. From there, a memory cell in the central store assigned to the transmitter is accessed in a conventional manner. By reason of the dial information transmitted by a transmitter, which dial information is communicated to the central store, information is available there about the desired receiver during the entire duration of the connection. For the purpose of switching the change, the communication between transmitter and receiver, there is conveyed to the output code transducer ACW, over transmission program control UEAS, the address of the desired receiver in binary form. After the decoding of a binary address in the output code transducer ACW, whereby, at the same time, the desired receiver is determined, the change in condition of the binary signal, as announced in the transmitter, i.e., the polarity change, is transmitted to the receiver.

Thus, in a first finding process all transmitters offering requests in the form of polarity changes, are identified. In a second finding process the transmitters are interrogated in an interrogation operation. The findings, as well as the interrogation process, are carried out by the input code transducer. Thirdly, the receiver to which a change in state must be conveyed is determined in a third finding process over the output code transducer ACW by reason of the address contained in the store. Finally, the change in state in question is transmitted to the receiver that was determined in a transmission operation.

With fault free operation of the system connection circuits, to which the incoming and outgoing connections, for example lines, are connected, a request signal is generated with each polarity change arriving on the line, which is searched for and identified by the input code transducer and which leads to the requesting of a cycle at the central store, over the transmission sequence control.

However, it is possible that a system connection circuit will operate faultily, and continuously offer a request signal, although no polarity changes arrive on the line assigned to it. This can occur, for example, when the requirement, as is customary, is not extinguished after a storage cycle has been allotted. In these cases, every time the input code transducer has found the requesting connection, i.e., the requesting system connection circuit, a cycle request signal proceeding from the transmission sequence control is sent to the storage unit. That can lead to the result that the transmission sequence control requires storage cycles without interruption.

It is an object of this invention to provide a method and means for avoiding the disadvantages discussed above.

SUMMARY OF THE INVENTION

In accordance with the invention, the aforementioned and other objects are achieved in that the address of a connection which generates a request signal and which has been identified over the input code transducer arrives in a first address store. Together with the address of the preceeding connection generating a request signal, which is stored in a second store, the address in the first store is available for a comparison process. In the case that both addresses are not identical, the address contained in the first address store is transferred to the second address store, whereas in the case of both addresses being identical, a notification is delivered to a store for continuous requirement, over which thereupon a signal blocking the inputs of the second address store is generated.

A second comparison process btween the address contained in the second address store and the addresses which are assigned to the connections, offering the succeeding requests, is then triggered, whereby, in the case of identity the forwarding of the request signal to the transmission sequence control is blocked, and an advancing signal arrives at the input code transducer. This signal serves to initiate the input code transducer for a new search and identification process, although a preceeding one has not been completed. Therefore, this signal is called an advancing signal. After the storage cycle is allotted, with which the last requirement proceeding from incoming connections was executed, a signal is emitted by the input code transducer, through which it can be recognized that no further requests exist. This signal arrives at the second address store and causes that the stored address to be extinguished.

BRIEF DESCRIPTION OF THE DRAWINGS

The principles of the invention will be most readily understood by reference to a description, given hereinbelow, of a preferred embodiment constructed according to these principles and to the drawings wherein.

DETAILED DESCRIPTION OF THE PREFERRED EMBODIMENT

Figure 1:
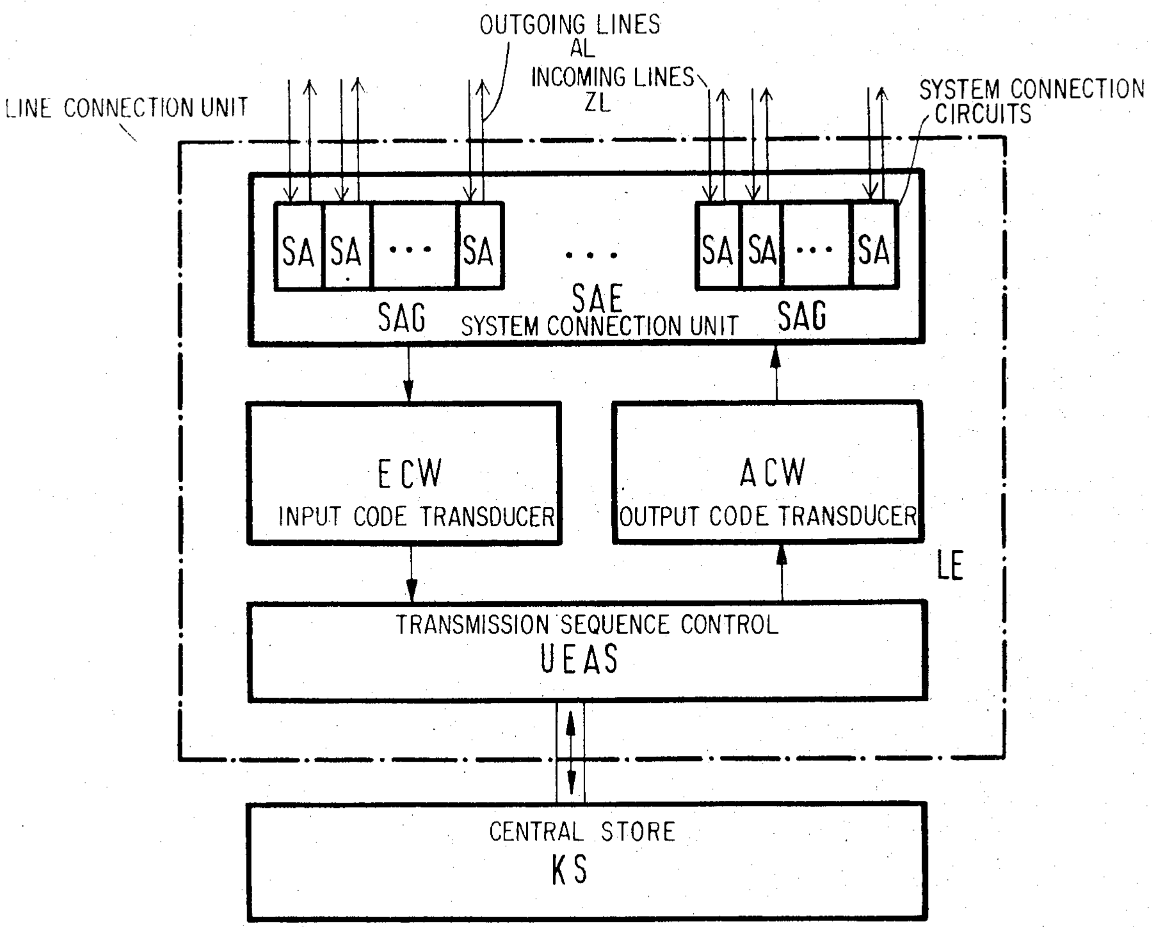
FIG. 1 is a block diagram of a prior art program controlled processing system and FIG. 2 is a block-schematic diagram of a preferred embodiment of a program controlled processing system constructed and operating according to the principles of the invention.
Figure 2:
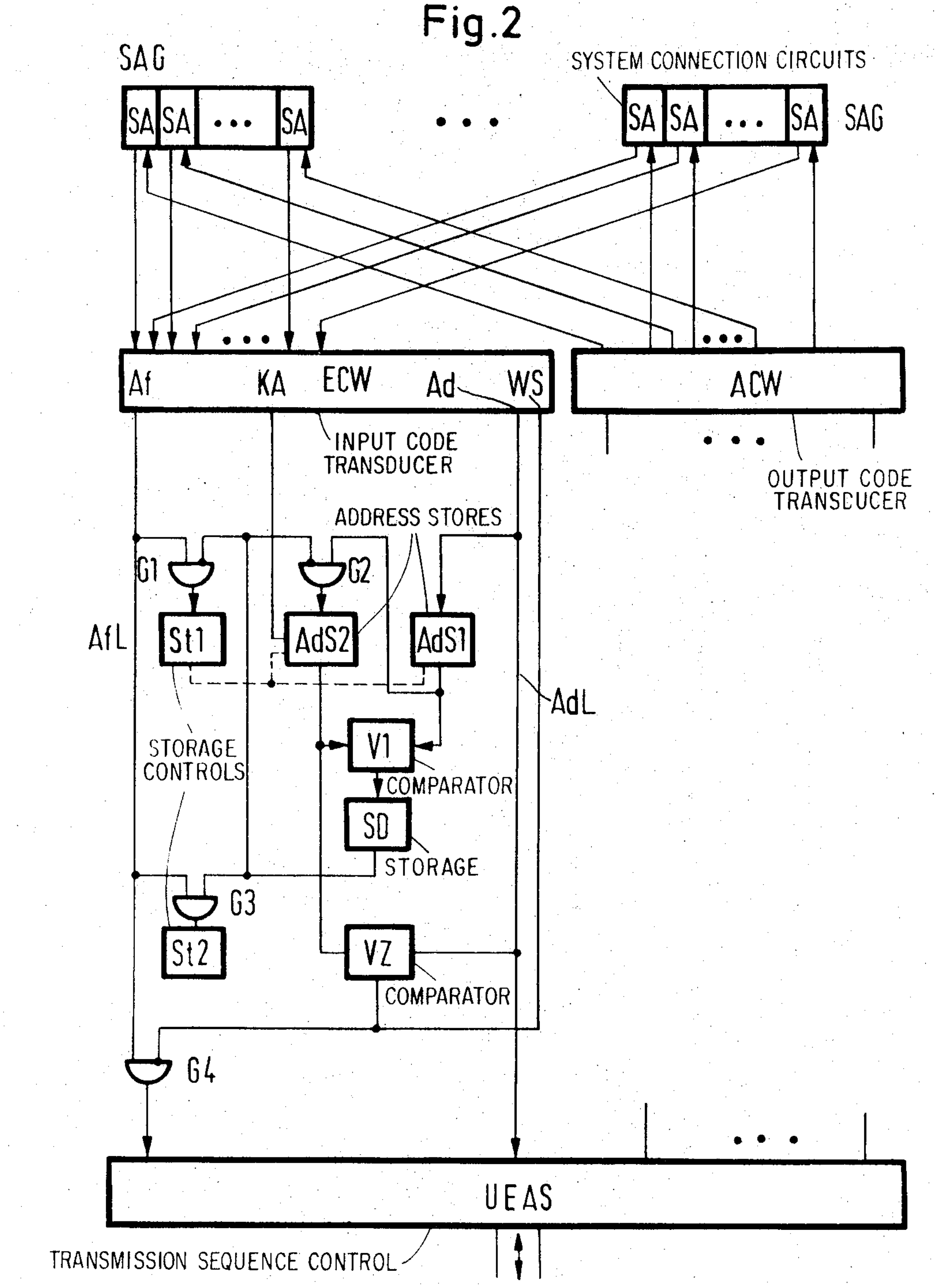

In the FIG. 2 embodiment, system connection circuits SA are combined into system connection groups SAG. Each system connection circuit has access to an input code transducer ECW and can be reached by an output code transducer ACW. Since the invention applies in essence only to the monitoring of the system connection circuits offering switching reuirements, the part of the line connection unit present between the input code transducer ECW and the transmission sequence control UEAS is shown only with the details necessary for understanding the invention.

It is to be understood that prior art devices are, otherwise, used. The devices necessary for carrying out the invention are, individually, two address stores AdS1 and AdS2, two control devices St1 and St2, two comparison devices V1 and V2 and a third store SD, which serves to receive continuous requirements. The construction of these devices is known, in the art, and will not be discussed herein.

The requirement signals emitted by the input code transducer ECW are transferred to a requirement line AfL of the transmission sequence control UEAS over the outlet Af. Over the outlet Ad of the input code transducer ECW, the address of the requiring system connection, which has been determined, is likewise available to the transmission sequence control UEAS over an address line AdL. A signal is available over a further outlet KA, which indicates that no more requirements are in the input code transducer ECW. Finally, the input code transducer ECW has another input WS, over which a signal can be inserted, which signal is evaulated in the input code transducer for the initiation of a new search and identification process, even when a preceding one has not been completed. The latter signal is referred to herein as an advancing signal.

The principles of operation of the example given in FIG. 2 are as follows.

Under the assumption that all connection requests have been completed, and that now there is a first new request to be processed, an address datum is emitted from the input code transducer ECW over outlet Ad, and a request signal is emitted over outlet Af. The address datum arrives also in the first address store AdS1 and is available therewith to the comparison device V1. Gates G1 and G2, connected in series with the first control device St1 and the second address store AdS2, are prepared such that the control device St1 is activated by the requirement signal. Control device St1 causes the emission of the information contained in the first address store AdS1 and in the second address store AdS2. The control devices mentioned hereinabove are conventional logic circuits which simply respond to the above described input signals to them to cause information emission in the described manner.

Since, in accordance with the aforementioned assumptions, the second address store AdS2 was not filled, the comparison device V1 discovers no identity of the two addresses. Since, therefore, a continuous requirement cannot be at issue, the third store SD is not switched on. Thus, the inputs of the first control device St1, which can be reached over the output of this store, remain passable over the gate G1 for incoming signals or data, and the input of the second address store AdS2 can be reached over the outlet of this store, over the gate G2. Thus, under the influence of the control device St1, the address stored in the first address store AdS1 is transferred into the second address store AdS2 over the gate G2. Since the gate G3 preceding the second control device St2 is opened only after the third store SD is switched on, the second control device St2 is not switched on by request signals. The request signals, as well as the address, are transferred to the transmission sequence control UEAS and lead from there to requiring and allotting of a storage cycle.

Under the assumption that through faulty behavior of the requesting system connection circuit, this system connection circuit maintains its requirement, even after the storage cycle has been allotted, and given that otherwise there is no requirement at the moment, the same address is again available at outlet Ad, as a result of the next search process in the input code transducer ECW. It is transferred in the described manner into the first address store AdS1 over the address line AdL. As a result of the now following comparison process in the comparison device V1, the addresses contained in the first and second address stores are found to be identical. Thereby, the store SD is switched on over the output of the comparison device V1, and a notification is given to it. A signal blocking the preceding gates of the inputs of the first control circuit St1 and of the second address store AdS2 is then available over the output of store SD, and a signal opening the gate G3 is made available. The inputs of the first control device St1 and of the second address store AdS2 are thereby blocked.

In this case, in order to prevent the forwarding of this request signal, when there is a request identified as a continuous request, the second comparison device V2 is present. Comparator V2 can be controlled over the second control device St2 and for comparing the address contained in the second address store AdS2 and the address emitted over the address line AdL by the input code converter ECW. This comparison process takes place, therefore, always when the presence of a continuous request is determined by the store SD, since only then can the second control device St2 be reached over the gate G3 for requirement signals coming from the input code converter ECW.

For the case when comparison device V2 determines that both addresses are identical, a signal is available at the output of the comparison device V2, which arrives as an advancing signal at the input WS of the input code converter, and which blocks the forwarding of the requirement signals to the transmission sequence control UEAS. The latter occurs in such a manner that a gate G4, which is switched into the requirement line AfL, is driven with the blocking signal over an input. The arrival of the advancing signal over the input WS in the input code transducer ECW leads, in a manner not described herein, to the result that the next received requirement is searched.

With regard to sequences occuring in a system of the described type, those sequences are under discussion which run during extremely short periods. For the case that there is only a single existing connection, it is possible that request signal will arrive sequentially, from the same system connection circuit. These will, of course, possess the same address, but this is not a faulty continuous request. In order to differentiate this case from a continuous request, a signal is formed in the input coder converter ECW, when after completion of a request, there are no further requests. For example, when a last request is extinguished, the signal is available over the outlet KA. Through the presence of this signal the second address store AdS2 is either extinguished or it is filed with a specific address which is not used in the system. In this way, it is achieved that the respective following address, which is determined on the basis of the request, does not triger a notification for a continuous request, in spite of its identity with the original address contained in the second address store AdS2.

The procedure indicated by the invention can be used to particular advantage when the requesting system connection circuits are not redundant, as is customary in an exchange system. Further, the procedure of the invention makes possible a very simple optical indication of the malfunctioning system connection circuit, since its address is present in storage. Thus, the faulty system connection circuit can be identified, for example, through an optical indicator.

The exemplary embodiment of the invention described hereinabove is intended only to be illustrative of the principles of the invention. It is to be understood that various modifications to or changes in the described embodiment may be within the scope of the invention as defined by the appended claims.

We claim:

1. In a program controlled telecommunication exchange system wherein the identification of incoming and outgoing connections, which are connected to system connection circuits within a line connection unit, takes place in input and output code transducers, respectively, and which system includes a central memory in which a storage cell is permanently assigned to each incoming connection and can be accessed by means of an address for the connection determined through identification of the system connection circuit and which includes a transmission sequence control for controlling signal traffic between said code transducers and said central memory and wherein an operating cycle is provided so that each incoming connection producing a request signal is interrogated, a method for monitoring the system connection circuits producing request signals comprising the steps of:

identifying in an input transducer, the address of a system connection circuit producing a request signal, placing said address of said system connection circuit in a first storage means, the address of a system connection circuit producing a preceeding request signal having been placed in a second storage means, comparing the contents of said first and second means, if the result of said comparison is that the contents of said first and said second storage means are not identical, transferring the contents of said first storage means to said second storage means, if the result of said comparison is that the contents of said first and second storage means are identical, communicating a signal indicating the result to a third storage means for continuous request signals, generating in said third storage means, as a result of receipt of said signal, a blocking signal, blocking the inputs of said first and second storage means upon appearance of said blocking signal, comparing upon the blocking of said inputs to said first and second storage means, the contents of said second storage means and address assigned to succeeding request signals, upon a determination of identity in the latter comparision step, blocking the transmission of the request signal to the transmission sequence control and generating an advancing signal upon a determination of identity in said latter comparison process and communicating said advancing signal to a said input code transducer.

2. The method defined in claim 1 comprising the additional step of:

after allotment of a storage cycle with which the last preceding incoming connection request is completed, emitting an indicating signal from said input code transducer to said second address storage means for extinguishing the address stored therein.

3. In a program controlled telecommunication exchange system in which incoming and outgoing connections are identified over input and output code transducers, respectively, and having a central memory in which a storage cell is premanently assigned to each incoming connection and can be accessed by means of an address for the connection determined through identification and having a transmission sequence control for controlling signal traffic between said code transducers and said central memory and wherein an operating cycle is provided so that each incoming connection producing a connection request is interrogated, the improvement comprising:

first address storage means, address line means connecting address outputs of said input code transducer to said first storage means for placing an address identified by said input code transducer in said first address storage means, first control means for evaluating request signals from said input code transducer, first gate means connecting an input of said first control means to a request output of said input code transducer, second storage means containing the address of the last preceding connection request, second gate means connecting an output of said first storage means to an input of said second storage means, first comparison means connected to outputs of said first and second storage means for comparing the contents of said first and second storage means, third storage means, means for switching said third storage means on, upon an indication by said first comparison means that the contents of said first and second storage means are identical, first blocking signal means connected to said first and second gate means for coupling a signal thereto blocking said first and second gates, said first blocking signal means being actuated upon actuation of said third storage means, second control means, third gate means connecting said second control means to said request output and to said blocking signal means, signals from said blocking signal means opening said third gate means for permitting said second control means to receive signals from said request output of said input code transducer, second comparison means connected to an output of said second address storage means and to said address line and responsive to actuation of said second control means by said third gate means for comparing the outputs of said second address storage means and said address line, fourth gate means for transmitting a connection request from said input code transducer to said transmission sequence control, and second blocking signal means for generating and transmitting a blocking signal to said fourth gate means responsive to an output from said second comparison means indicating identity and for generating an advancing signal communicated to said input code transducer.

4. The program controlled telecommunication exchange defined in claim 3 further comprising:

means for indicating that all connection requests have been completed and for erasing, responsive thereto, the contents from said second address storage means.

* * * * *